United States Patent
Lo

(10) Patent No.: US 9,782,901 B1
(45) Date of Patent: Oct. 10, 2017

(54) ROBOTIC ARM SUCTION CUP CAPABLE OF ELIMINATING NEGATIVE PRESSURE

(71) Applicant: Bingotimes Digital Technology Co., Ltd., Taichung (TW)

(72) Inventor: Chih-Tsung Lo, Taichung (TW)

(73) Assignee: BINGOTIMES DIGITAL TECHNOLOGY CO., LTD., Taichung (TW)

( * ) Notice: Subject to any disclaimer, the term of this patent is extended or adjusted under 35 U.S.C. 154(b) by 0 days.

(21) Appl. No.: 15/414,575

(22) Filed: Jan. 24, 2017

(51) Int. Cl.
*B25J 15/06* (2006.01)

(52) U.S. Cl.
CPC ....... *B25J 15/0683* (2013.01); *B25J 15/0625* (2013.01); *Y10S 901/40* (2013.01)

(58) Field of Classification Search
CPC .... H01L 21/6838; B66C 1/02; B25J 17/0275; B25J 15/0616; B25J 15/02; B25J 15/0023; B25J 17/0208; B25J 15/0208; B25J 15/0683; B25J 15/0625; Y10S 901/40
USPC .................... 294/183, 64.2, 64.3; 901/40, 45
See application file for complete search history.

(56) References Cited

U.S. PATENT DOCUMENTS

| | | | | | |
|---|---|---|---|---|---|
| 4,129,328 | A | * | 12/1978 | Littell | B65G 47/918 294/65 |
| 5,609,377 | A | * | 3/1997 | Tanaka | B65G 47/918 294/65 |
| 5,622,362 | A | * | 4/1997 | Shiiki | B65H 3/0816 271/106 |
| 7,281,739 | B2 | * | 10/2007 | Kniss | B25J 13/086 294/65 |
| 8,025,323 | B2 | * | 9/2011 | Ransom | B25J 15/0052 294/65 |

* cited by examiner

*Primary Examiner* — Stephen Vu
(74) *Attorney, Agent, or Firm* — Raymond Y. Chan; David and Raymond Patent Firm

(57) ABSTRACT

A robotic arm suction cup capable of eliminating negative pressure is provided. A robotic arm is provided with a first suction cup and a second suction cup of unequal length. Each of the first and second suction cups is connected with a Y-shaped tube. An end of the Y-shaped tube is connected with a communication tube. The communication tube is connected with a vacuum pump. Another end of the Y-shaped tube is connected with a pressure detection tube. A distal end of the pressure detection tube is connected with a pressure detector. The first and second suction cups are not coplanar, and can effectively eliminate the negative pressure between the first and second suction cups and a playing card rapidly, so that the playing card can be separated from the first and second suction cups easily for the game to go on smoothly.

3 Claims, 7 Drawing Sheets

ROBOTIC ARM SUCTION CUP CAPABLE OF ELIMINATING NEGATIVE PRESSURE

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to a robotic arm suction cup capable of eliminating negative pressure, and more particularly to a robotic arm having two suction cups of unequal length able to eliminate negative pressure in the suction cups when a playing card is released from the suction cups for the game to go on smoothly.

Description of Related Arts

As shown in FIGS. 1, 2 and 3, in order to prevent players from touching playing cards, a shuffling machine 10 and a robotic arm 20 having a suction cup 21 are provided for playing a game. The suction cup 21 is connected with a vacuum pump 23 having a solenoid valve 24 through a communication tube 22. The shuffling machine 10 is formed with a central accommodation trough 11, a left accommodation trough 12, and a right accommodation trough 13. The playing cards 1 can be shuffled and stacked by the shuffling machine 10, and then the suction cup 21 of the robotic arm 20 is used to suck and place the playing cards in the central accommodation trough 11, the left accommodation trough 12, and the right accommodation trough 13, respectively. During the game, the playing cards 1 are completely operated by the machine, without any manual step, to avoid any fraud caused by personal factors. When the game is going on, the suction cup 21 is moved to be over the playing card 1, and the solenoid valve 24 is opened so that the vacuum pump 23 expels the air in the suction cup 21 and the communication pipe 22 to form a negative pressure state. The suction cup 21 sucks the playing card 1 from the central accommodation trough 11 and displays the playing card 1 to the player, and then the playing card 1 is recycled to the left accommodation trough 12 or the right accommodation trough 13 successively. For the playing card 1 to separate from the suction cup 21 and fall into the left accommodation trough 12 or the right accommodation trough 13, the solenoid valve 24 is closed and the vacuum pump 23 stops sucking. At this time, the suction cup 21 has residual negative pressure therein. In general, the surface of the playing card 1 is not absolutely airtight and the air gradually enters from the periphery of the suction cup 21 until the pressure between the suction cup 21 and the playing card 1 becomes normal pressure and the playing card 1 is detached from the suction cup 21 to fall. The required time is too long. As a result, the player will reduce his/her will to play the game. In view of this, how to quickly eliminate the negative pressure between the playing card 1 and the suction cup 21 needs to be improved. Accordingly, the inventor of the present invention has devoted himself based on his many years of practical experiences to solve these problems.

SUMMARY OF THE PRESENT INVENTION

The primary object of the present invention is to solve the aforesaid problems and to provide a robotic arm suction cup capable of eliminating negative pressure. A robotic arm is provided with a first suction cup and a second suction cup of unequal length. The two suction cups are not coplanar. When a playing card is sucked by the two suction cups, the playing card is slightly deformed to form a curve. The playing card itself has counterforce to generate an elastic force for the playing card to restore to be flat. When the suction cups stop sucking, because the first and second suction cups have a difference of level, the two suction cups are not parallel to the playing card. A fulcrum is formed between the playing card and one side of each of the first and second suction cups. The other side of the suction cup is separated from the playing card to form the weakness of air tightness of the suction cup. The robotic arm is turned an angle for the playing card to touch a trough wall, which facilitates the air to enter the suction cups to eliminate the negative pressure. Therefore, the playing card falls down quickly, allowing the game to go on smoothly and fluently.

According to the aforesaid object, a robotic arm suction cup capable of eliminating negative pressure is provided. A robotic arm is provided with a first suction cup and a second suction cup of unequal length. Each of the first and second suction cups is connected with a Y-shaped tube. An end of the Y-shaped tube is connected with a communication tube. The communication tube is orderly connected with an air filter and a vacuum pump. A solenoid valve is provided between the air filter and the vacuum pump. Another end of the Y-shaped tube is connected with a pressure detection tube. A distal end of the pressure detection tube is connected with a pressure detector. The first and second suction cups are not coplanar, and can effectively eliminate the negative pressure between the first and second suction cups and a playing card in a rapid manner, so that the playing card can be separated from the first and second suction cups easily for the game to go on smoothly.

DETAILED DESCRIPTION OF THE PREFERRED EMBODIMENT

Embodiments of the present invention will now be described, by way of example only, with reference to the accompanying drawings.

Figure 1:
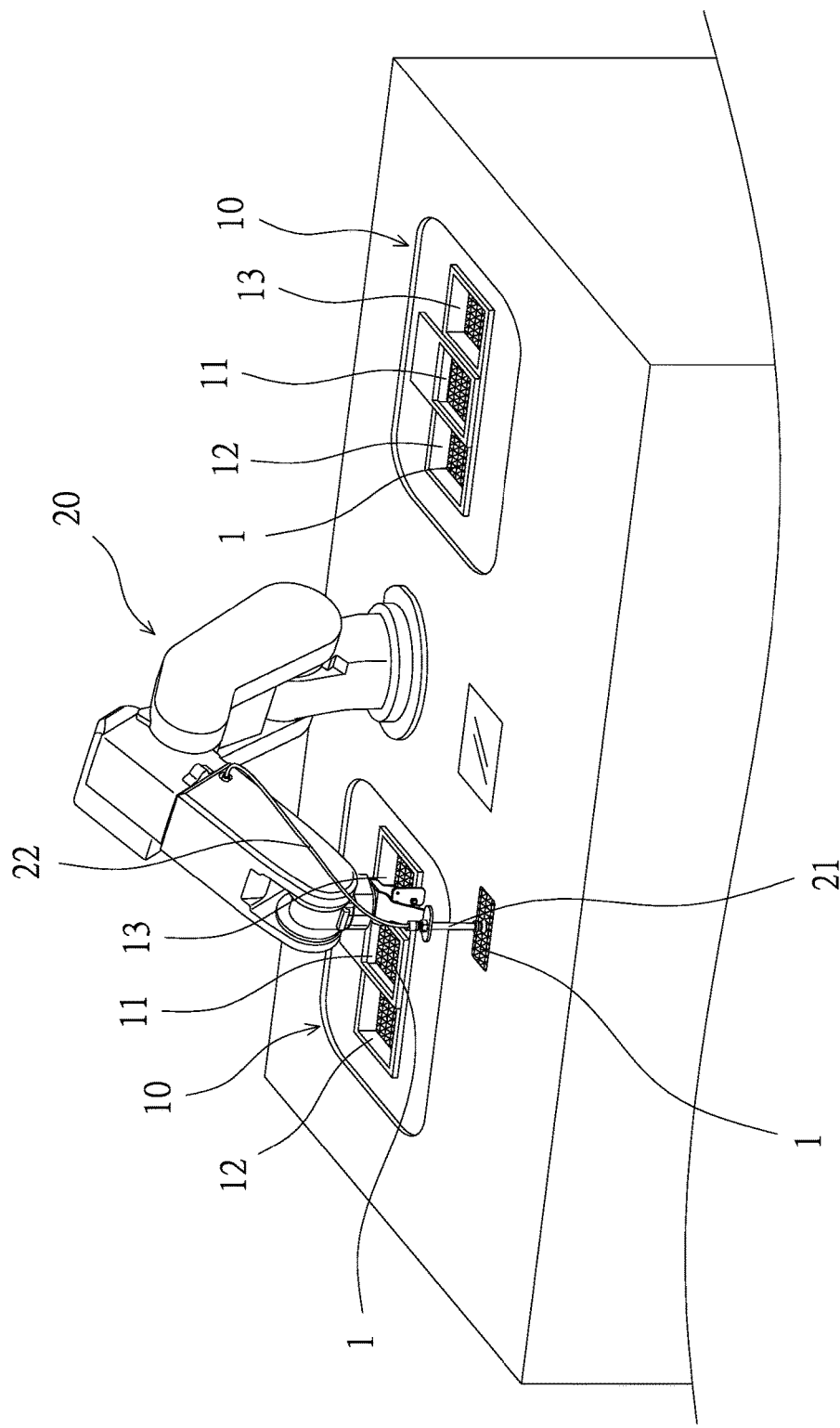
FIG. 1 is a perspective view of a conventional robotic arm dealing machine.
Figure 2:
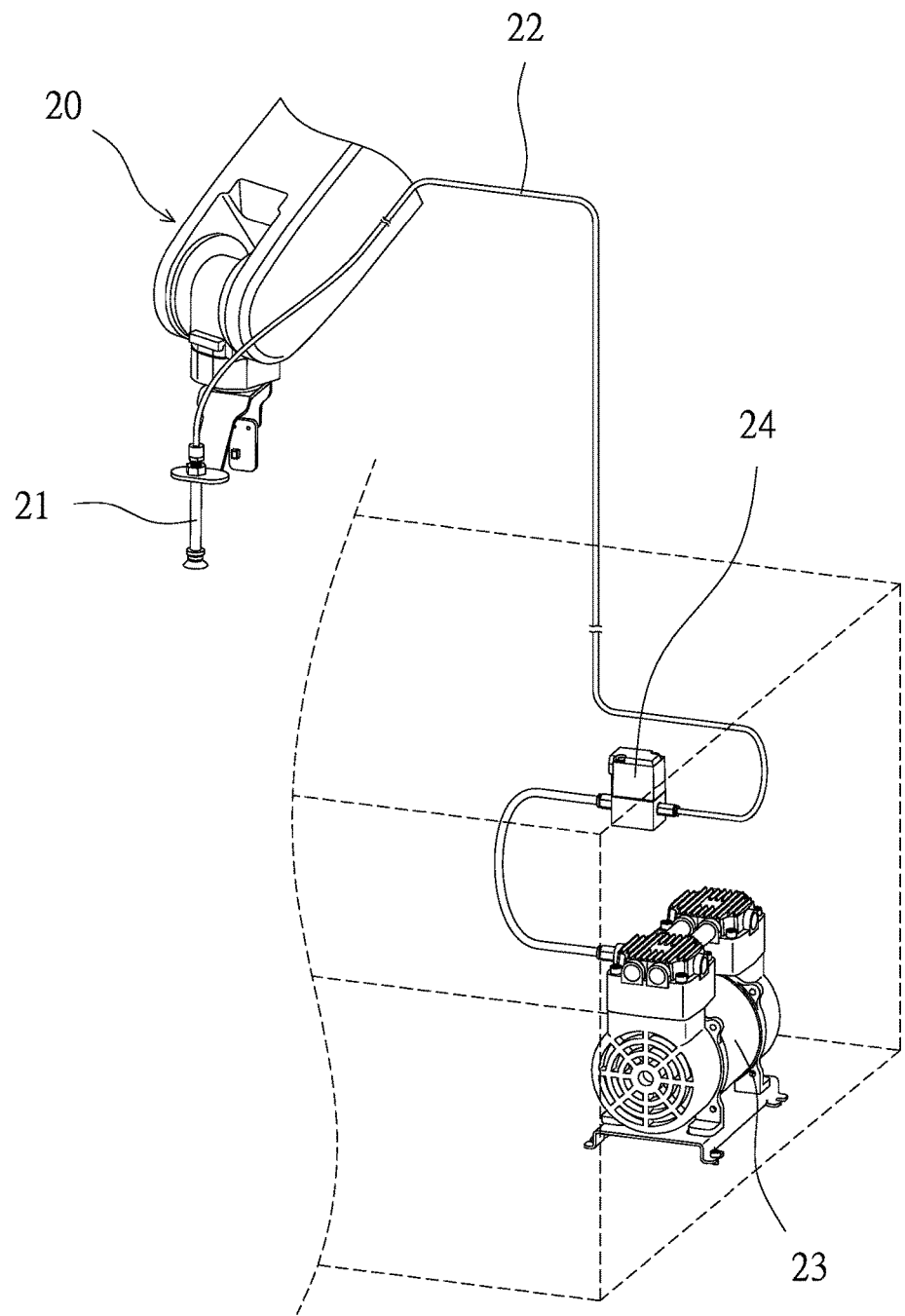
FIG. 2 is a perspective view of a suction cup of the conventional robotic arm dealing machine.
Figure 3:
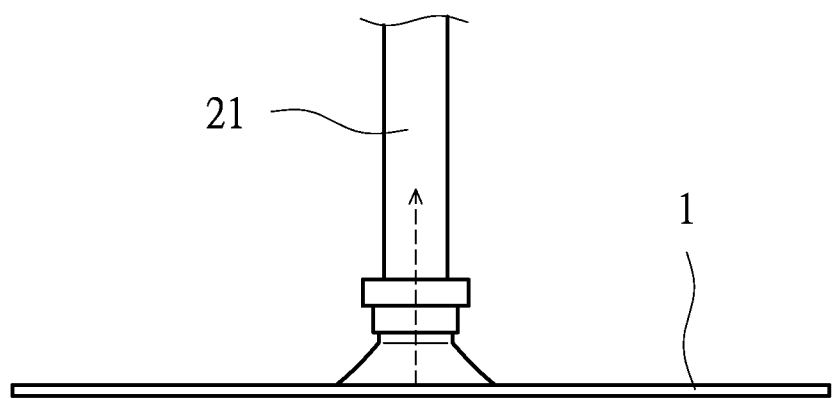
FIG. 3 is a partial planar view showing a playing card to be sucked by the suction cup of the conventional robotic arm dealing machine.
Figure 4:
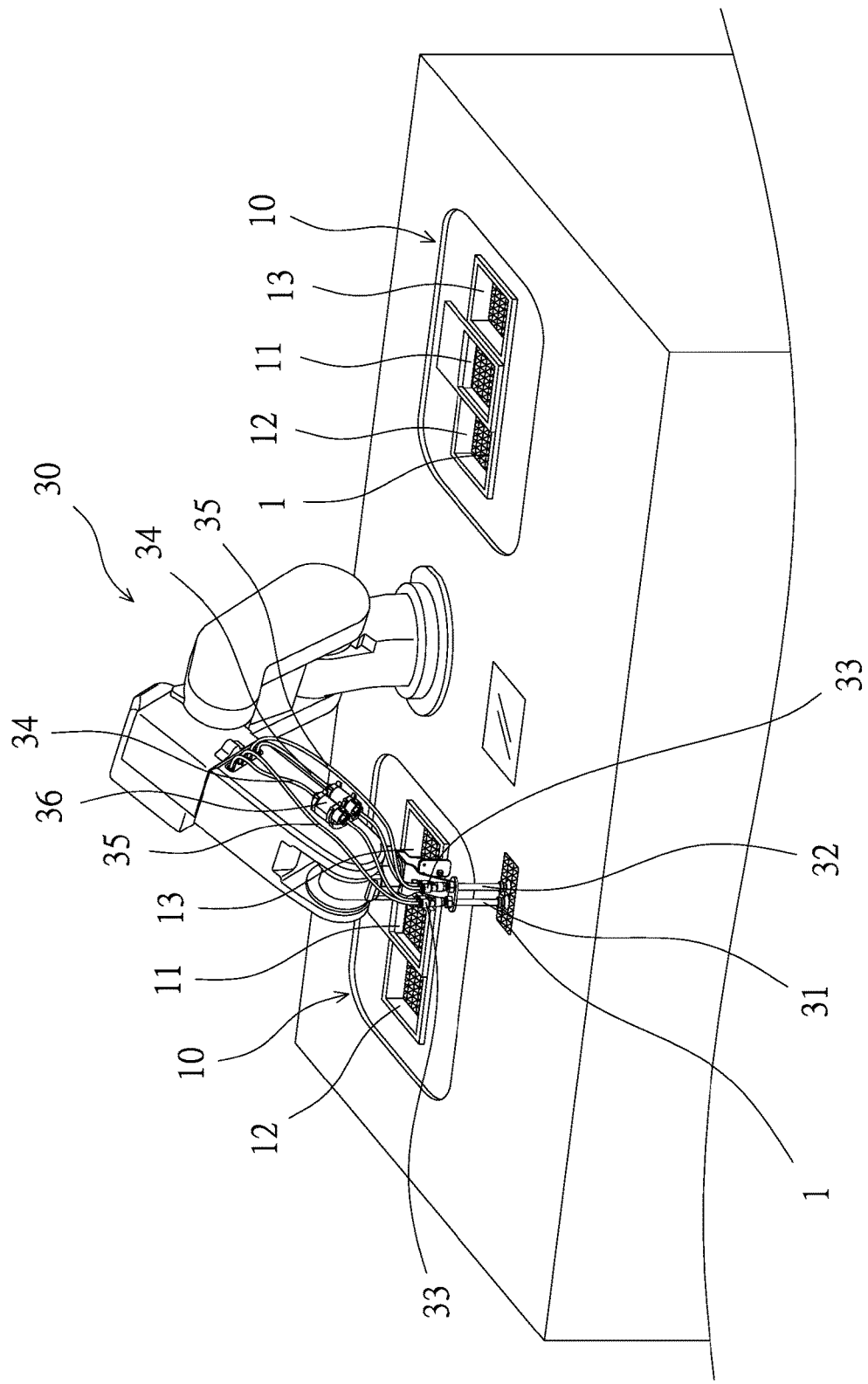
FIG. 4 is a perspective view of a robotic arm dealing machine in accordance with an embodiment of the present invention.
Figure 5:
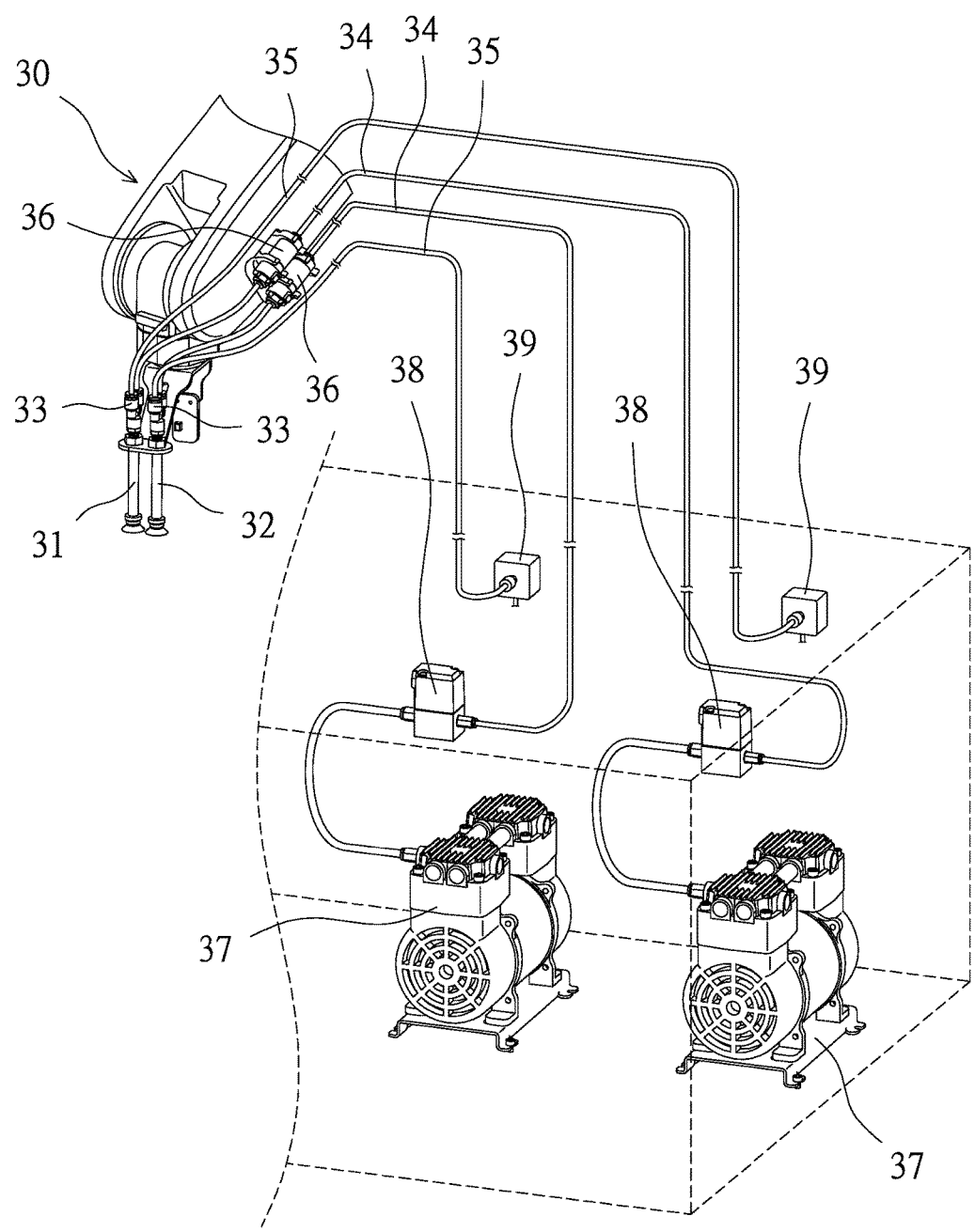
FIG. 5 is a perspective view of a first suction cup and a second suction cup in accordance with the embodiment of the present invention.

Referring to FIGS. 4 and 5, a robotic arm 30 is provided with a first suction cup 31 and a second suction cup 32 of unequal length. Each of the first and second suction cups 31, 32 is connected with a Y-shaped tube 33. An end of the Y-shaped tube 33 is connected with a communication tube 34. The communication tube 34 is orderly connected with an air filter 36 and a vacuum pump 37. A solenoid valve 38 is provided between the air filter 36 and the vacuum pump 37. Another end of the Y-shaped tube 33 is connected with a pressure detection tube 35. A distal end of the pressure detection tube 35 is connected with a pressure detector 39. The first and second suction cups 31, 32 are not coplanar, and can effectively eliminate the negative pressure between the first and second suction cups 31, 32 and a playing card 1 in a rapid manner, so that the playing card 1 can be separated from the first and second suction cups 31, 32 easily for the game to go on smoothly.

Figure 6:
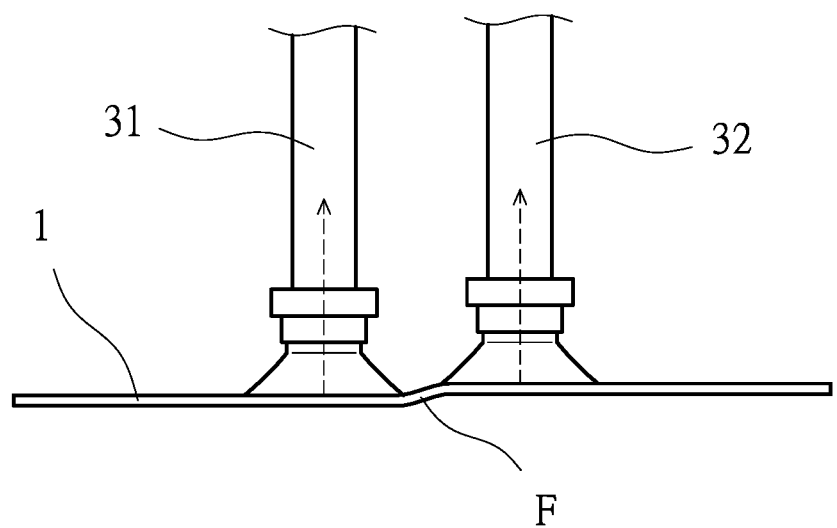
FIG. 6 is a partial planar view showing a playing card to be sucked by the first suction cup and the second suction cup in accordance with the embodiment of the present invention.
Figure 7:
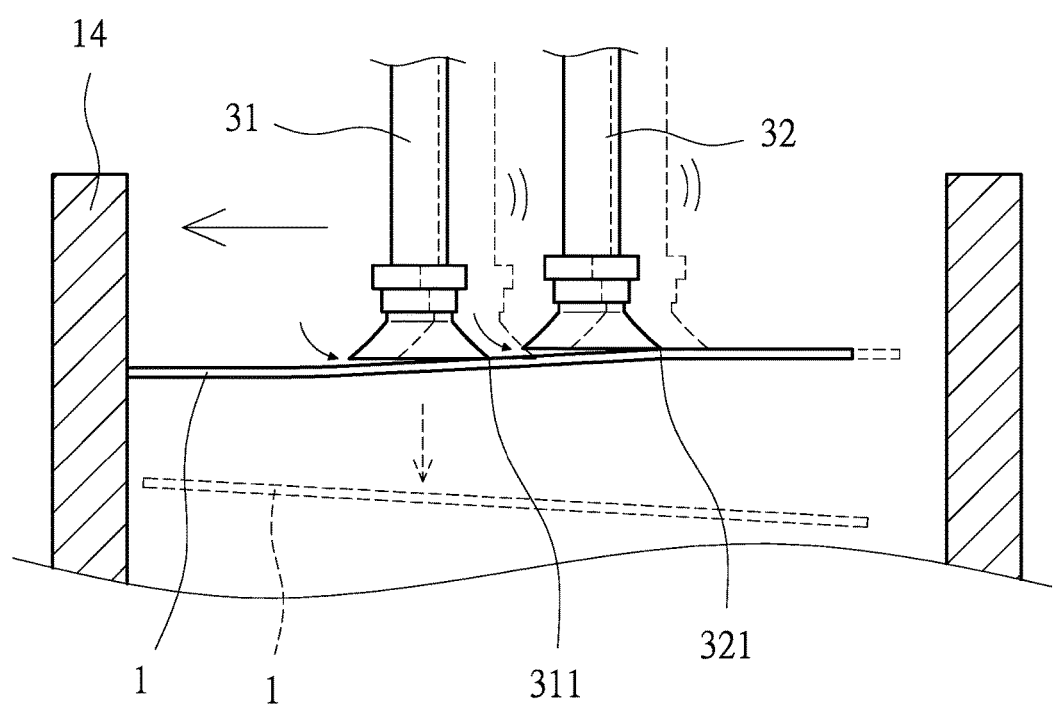
FIG. 7 is a partial planar view showing the playing card to be released from the first suction cup and the second suction cup in accordance with the embodiment of the present invention.

The assembly, function and details of the present invention are described below. Referring to FIGS. 4 to 7, the vacuum pump 37 of the present invention is in an activated state and the solenoid valve 38 is closed. The first and second suction cups 31, 32 are moved by the robotic arm 30 to the central accommodation trough 11 of the shuffling machine 10 to suck the playing card 1, meanwhile, the solenoid valve 38 is opened. The vacuum pump 37 sucks air through the first and second suction cups 31, 32. The air passes through the air filter 36 and the solenoid valve 38 and then is expelled through the vacuum pump 37, such that the first and second suction cups 31, 32 generate negative-pressure suction. The air filter 36 can filter dust, dirt and moisture to protect the solenoid valve 38 and the vacuum pump 37. The pressure detector 39 can detect whether or not the suction generated by the operation of the vacuum pump 37 conforms to the preset pressure value so that the first and second suction cups 31, 32 do suck the playing card 1. The first suction cup 31 has a length greater than that of the second suction cup 32 (or the first suction cup 31 has a length less than that of the second suction cup 32) so that the two suction cups are not coplanar. When the playing card 1 is sucked, the playing card 1 is slightly deformed to form a curve F (as shown in FIG. 6). Then, the robotic arm 30 brings the playing card 1 to an identification box, records the suit and numeral of the playing card 1, and then displays the playing card 1 to the player. The game is fair. After displaying, the playing card 1 is recycled and successively placed into the left accommodation trough 12 or the right accommodation trough 13 of the shuffling machine by the robotic arm 30. When the first and second suction cups 31, 32 are moved to be over the left accommodation trough 12 or the right accommodation trough 13 to release the playing card 1, the height of the playing card 1 is lower than the tops of the left and right accommodation troughs 12, 13, and the solenoid valve 38 is in a closed state. The vacuum pump 37 no longer expels the air in the first and second suction cups 31, 32, but there is negative-pressure suction remaining between the first and second suction cups 31, 32 and the playing card 1 so that the playing card 1 does not immediately fall. The playing card 1 is no longer attracted by the first and second suction cups 31, 32 and restored to be flat with its own elasticity. Because the first and second suction cups 31, 32 have a difference of level, a first fulcrum 311 and a second fulcrum 321 are respectively formed between the playing card 1 and one side of each of the first and second suction cups 31, 32, as shown in FIG. 7. The playing card 1 is supported by the first fulcrum 311 and the second fulcrum 321. The other side of each of the first and second suction cups 31, 32, opposite the first fulcrum 311 and the second fulcrum 321, is separated from the playing card 1 to form the weakness of air tightness of the first and second suction cups 31, 32, which accelerates the air to enter the first suction cup 31 and the second suction cup 32 to eliminate the negative pressure quickly. Meanwhile, the playing card 1 is in the left or right accommodation trough 12, 13, and the first and second suction cups 31, 32 are turned an angle by the robotic arm 30 for the playing card 1 to touch the trough wall 14 to bring a displacement between the playing card 1 and the first and second suction cups 31, 32 to break the airtightness of the suction cups so as to eliminate the negative pressure more quickly. Therefore, without the negative pressure in the suction cups, the playing card 1 falls down due to its own weight. This effectively prevents the negative pressure in the first and second suction cups 31, 32 from sucking the playing card 1, allowing the game to go on smoothly and fluently, thereby enhancing the will of the player to play the game.

In addition, it is worth mentioning that when the vacuum pump 37 or other equipment for the first suction cup 31 or the second suction cup 32 to generate negative pressure malfunctions, the other normal suction cup can be used for the game to go on. After the game is over, the machine undergoes an inspection and repair to avoid the game from being interrupted to affect the mood of the player.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A robotic arm suction cup arrangement of a robotic cup for eliminating negative pressure, comprising a first suction cup and a second suction cup of unequal length, the first suction cup being connected with a first Y-shaped tube, an end of the first Y-shaped tube being connected with a first communication tube, the first communication tube being orderly connected with a first air filter and a first vacuum pump, a first solenoid valve being provided between the first air filter and the first vacuum pump; another end of the first Y-shaped tube being connected with a first pressure detection tube, a distal end of the first pressure detection tube being connected with a first pressure detector; the second suction cup being connected with a second Y-shaped tube, an end of the second Y-shaped tube being connected with a second communication tube, the second communication tube being orderly connected with a second air filter and a second vacuum pump, a second solenoid valve being provided between the second air filter and the second vacuum pump; another end of the second Y-shaped tube being connected with a second pressure detection tube, a distal end of the second pressure detection tube being connected with a second pressure detector.

2. The robotic arm suction cup as claimed in claim 1, wherein the first suction cup has a length greater than that of the second suction cup.

3. The robotic arm suction cup as claimed in claim 1, wherein the first suction cup has a length less than that of the second suction cup.

* * * * *